United States Patent
Ando et al.

(10) Patent No.: US 11,098,157 B2
(45) Date of Patent: *Aug. 24, 2021

(54) POLYESTER RESIN COMPOSITION

(71) Applicant: ENEOS CORPORATION, Tokyo (JP)

(72) Inventors: Masatoshi Ando, Tokyo-to (JP); Hiroshi Matsuura, Tokyo-to (JP)

(73) Assignee: ENEOS CORPORATION, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 16/338,048

(22) PCT Filed: Sep. 28, 2017

(86) PCT No.: PCT/JP2017/035326
§ 371 (c)(1),
(2) Date: Mar. 29, 2019

(87) PCT Pub. No.: WO2018/062426
PCT Pub. Date: Apr. 5, 2018

(65) Prior Publication Data
US 2019/0233581 A1 Aug. 1, 2019

(30) Foreign Application Priority Data
Sep. 29, 2016 (JP) .............................. JP2016-191744

(51) Int. Cl.
| | |
|---|---|
| C08G 63/185 | (2006.01) |
| C08G 63/193 | (2006.01) |
| C08K 7/06 | (2006.01) |
| C08K 3/013 | (2018.01) |
| C08K 7/14 | (2006.01) |
| C08K 3/04 | (2006.01) |
| C08K 3/30 | (2006.01) |
| C08L 27/12 | (2006.01) |
| C08K 7/10 | (2006.01) |
| C08L 67/03 | (2006.01) |
| C08K 7/02 | (2006.01) |
| C08L 67/00 | (2006.01) |

(52) U.S. Cl.
CPC ......... *C08G 63/185* (2013.01); *C08G 63/193* (2013.01); *C08K 3/013* (2018.01); *C08K 3/042* (2017.05); *C08K 3/30* (2013.01); *C08K 7/02* (2013.01); *C08K 7/06* (2013.01); *C08K 7/10* (2013.01); *C08K 7/14* (2013.01); *C08L 27/12* (2013.01); *C08L 67/00* (2013.01); *C08L 67/03* (2013.01); *C08K 2003/3009* (2013.01)

(58) Field of Classification Search
CPC ............... C08G 63/185; C08G 63/193; C08K 2003/3009; C08K 3/013; C08K 3/042; C08K 3/30; C08K 7/02; C08K 7/06; C08K 7/10; C08K 7/14; C08K 5/527; C08L 27/12; C08L 67/00; C08L 67/03
See application file for complete search history.

(56) References Cited

U.S. PATENT DOCUMENTS

| | | | | |
|---|---|---|---|---|
| 3,317,464 A | * | 5/1967 | Conix | C08G 63/193 528/176 |
| 4,474,938 A | * | 10/1984 | Richardson | C08G 63/19 528/125 |
| 4,762,909 A | | 8/1988 | Walters | |
| 5,175,236 A | * | 12/1992 | Irwin | D01F 6/84 528/272 |
| 6,846,433 B2 | | 1/2005 | Okamoto et al. | |

(Continued)

FOREIGN PATENT DOCUMENTS

| | | |
|---|---|---|
| EP | 0 215 543 | 3/1987 |
| EP | 1 052 272 | 11/2000 |

(Continued)

OTHER PUBLICATIONS

Extended European Search Report dated Feb. 10, 2020 in corresponding European Patent Application No. 17856375.5.

(Continued)

*Primary Examiner* — Ling Siu Choi
*Assistant Examiner* — Gennadiy Mesh
(74) *Attorney, Agent, or Firm* — Wenderoth, Lind & Ponack, L.L.P.

(57) ABSTRACT

A polyester resin composition comprising a crystalline wholly aromatic polyester which is a polycondensate of an aromatic dicarboxylic acid and an aromatic diol, and a filler, wherein
a structural unit derived from the aromatic dicarboxylic acid comprises a structural unit represented by chemical formula (1):

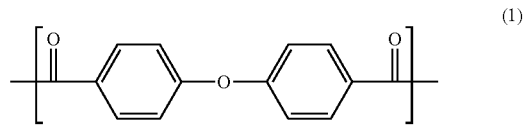

(1)

and a structural unit derived from the aromatic diol comprises chemical formula (4):

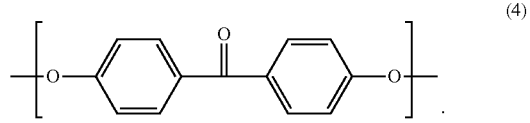

(4)

wherein content of a residue of 4,4'-dicarboxy diphenyl ether (corresponding to the structural units represented by chemical formula (1)) and a residue of 4,4'-dihydroxy benzophenone (corresponding to the structural units represented by chemical formula (4)) is at least 80 mol % in the entire structural units of the crystalline wholly aromatic polyester.

16 Claims, No Drawings

(56) References Cited

U.S. PATENT DOCUMENTS

| | | | | |
|---|---|---|---|---|
| 7,063,892 | B2* | 6/2006 | Okamoto | B32B 7/12 |
| | | | | 428/423.4 |
| 10,508,170 | B2* | 12/2019 | Ando | C08G 63/80 |
| 2003/0089887 | A1* | 5/2003 | Okamoto | C08K 5/527 |
| | | | | 252/299.01 |
| 2004/0152865 | A1* | 8/2004 | Okamoto | C08G 63/605 |
| | | | | 528/302 |
| 2004/0164282 | A1* | 8/2004 | Okamoto | H01B 3/423 |
| | | | | 252/572 |
| 2004/0210032 | A1* | 10/2004 | Okamoto | C08G 63/685 |
| | | | | 528/272 |
| 2018/0105641 | A1* | 4/2018 | Ando | C08G 63/672 |

FOREIGN PATENT DOCUMENTS

| | | |
|---|---|---|
| JP | 62-7715 | 1/1987 |
| JP | 5-25370 | 2/1993 |
| JP | 2015-117351 | 6/2015 |

OTHER PUBLICATIONS

International Preliminary Report on Patentability dated Apr. 11, 2019 in International Application No. PCT/JP2017/035326.
International Search Report dated Dec. 12, 2017 in International Application No. PCT/JP2017/035326.
Office Action dated Nov. 2, 2020 in corresponding Chinese Patent Application No. 201780059158.8, with Machine translation.

\* cited by examiner

POLYESTER RESIN COMPOSITION

BACKGROUND OF THE INVENTION

Field of the Invention

The present invention relates to a polyester resin composition comprising crystalline wholly aromatic polyester and a filler. The present invention also relates to a molded article comprising the polyester resin composition according to the present invention.

Background Art

Wholly aromatic polyether ether ketone having a repeating unit of ether bond, ether bond, and ketone bond is known to be a constituent material having excellent toughness and abrasion resistance. Also is known a method for manufacturing a polymer having a ketone bond in the repeating structural unit. For example, a method for manufacturing a polymer is proposed, in which (a) an organic compound containing at least one trichloromethyl ketone group is reacted with (b) an organic compound containing at least one hydroxyl group, amino group, or acyl group (see Patent Document 1).

PRIOR ART DOCUMENTS

Patent Document

Patent Document 1 JPS62-7715A

SUMMARY OF THE INVENTION

Problem to be Solved

However, there is no detailed suggestion of the material properties of the polymer as described in Patent Document 1, despite that there is a need to obtain a molded article having excellent mechanical properties and slide properties by using a resin composition comprising polyester with heat resistance. Therefore, the object of the present invention is to obtain a polyester resin composition for obtaining a molded article having heat resistance of the crystalline wholly aromatic polyester as well as having excellent mechanical properties.

Means to Solve the Problem

In order to solve the above described technical problems, the present inventors intensively studied to find that the above-described problem can be solved by blending the crystalline wholly aromatic polyester comprising a structural unit derived from a specific "aromatic dicarboxylic acid having an ether group in the molecule" and a structural unit derived from a specific "aromatic diol having a carbonyl group (ketone group) in the molecule", and a filler in the polyester resin composition, and accordingly completed the present invention.

According to one aspect of the present invention, there is provided a polyester resin composition comprising, crystalline wholly aromatic polyester which is a polycondensate of aromatic dicarboxylic acid and aromatic diol, and a filler, wherein
the structural unit derived from the aromatic dicarboxylic acid comprises a structural unit represented by chemical formula (1):

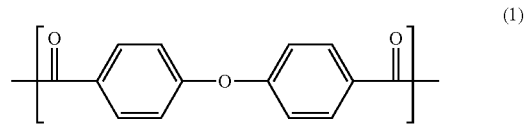

and the structural unit derived from the aromatic diol comprises chemical formula (4):

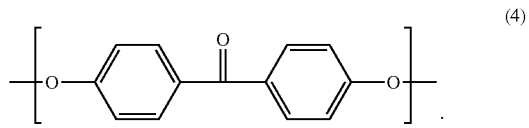

In one aspect of the present invention, the filler preferably comprises a fibrous filling material.

In one aspect of the present invention, the fibrous filling material is preferably selected from the group consisting of carbon fibers, silicon carbide fibers, ceramic fibers, glass fibers, wollastonites, whiskers, and metallic fibers.

In one aspect of the present invention, the filler preferably comprises a nonfibrous filling material.

In one aspect of the present invention, the nonfibrous filling material is preferably selected from the group consisting of a fluorine resin, graphite, and molybdenum disulfide.

In one aspect of the present invention, the content of the filler in the polyester resin composition is preferably from 1 to 200 parts by weight based on 100 parts by weight of the crystalline aromatic polyester.

In one aspect of the present invention, the structural unit derived from aromatic diol preferably further comprises at least one of the structural units represented by chemical formula (5), chemical formula (6), chemical formula (7), and chemical formula (8):

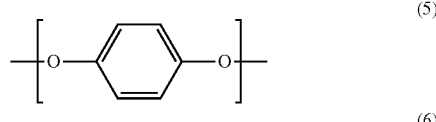

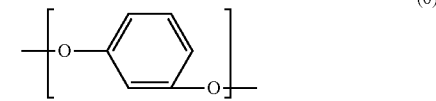

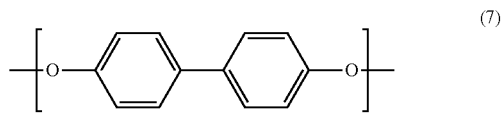

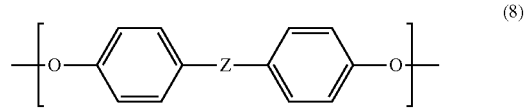

wherein,
Z is a divalent substituent group having 1 to 20 atoms comprising at least one of a hydrocarbon group, an oxygen atom, and a sulfur atom, wherein the substituent group may have a halogen atom bound thereto, provided that Z is not carbonyl group-C(=O)—.

According to another aspect of the present invention, there is provided a molded article consisting of the above-described polyester resin composition.

Effect of the Invention

The polyester resin composition according to the present invention is capable of providing a molded article having heat resistance as well as having excellent mechanical properties such as bending strength and bending elastic modulus, and slide properties. Such molded article has an advantage as a constituent material in a field where high mechanical properties are required, examples being constituent materials of various mechanical parts, automobile parts, and electric and electronic parts.

MODE FOR CARRYING OUT THE INVENTION

<Polyester Resin Composition>

The polyester resin composition according to the present invention comprises crystalline wholly aromatic polyester as described below and a filler as described below. By combining and blending the below-described crystalline wholly aromatic polyester and the below-described filler, such polyester resin composition is capable of providing a molded article having heat resistance as well as having excellent mechanical properties such as bending strength and bending elastic modulus.

[Crystalline Wholly Aromatic Polyester]

Crystalline wholly aromatic polyester is a polycondensate of aromatic dicarboxylic acid and aromatic diol, and comprises a structural unit derived from a specific "aromatic dicarboxylic acid having an ether group in the molecule" and a structural unit derived from a specific "aromatic diol having a carbonyl group (ketone group) in the molecule" as a main repeating structural unit. In the present invention, in view of heat resistance and mechanical properties, the total of the structural unit derived from a specific "aromatic dicarboxylic acid having an ether group in the molecule" and the structural unit derived from a specific "aromatic diol having a carbonyl group (ketone group) in the molecule" in the entire structural units of the crystalline wholly aromatic polyester is preferably from 80 mol % to 100 mol %, and more preferably from 85 mol % to 95 mol %.

(Aromatic Dicarboxylic Acid)

The structural unit derived from aromatic dicarboxylic acid having an ether group in the molecule is chemical formula (1), which can be obtained by using, for example, 4,4'-dicarboxy diphenyl ether (chemical formula (9)).

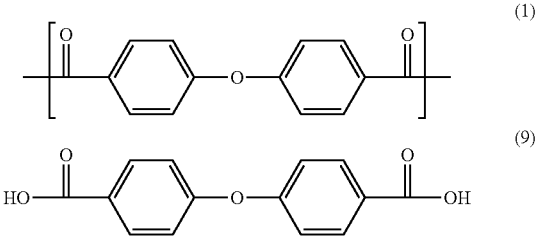

(1)

(9)

In the present invention, a moiety of the structural unit represented by chemical formula (1) may be substituted by a structural unit represented by either of chemical formula (2) or chemical formula (3). These structural units can be obtained by using, for example, terephthalic acid (chemical formula (10)) and derivatives thereof, and isophthalic acid (chemical formula (11)) and derivatives thereof, respectively.

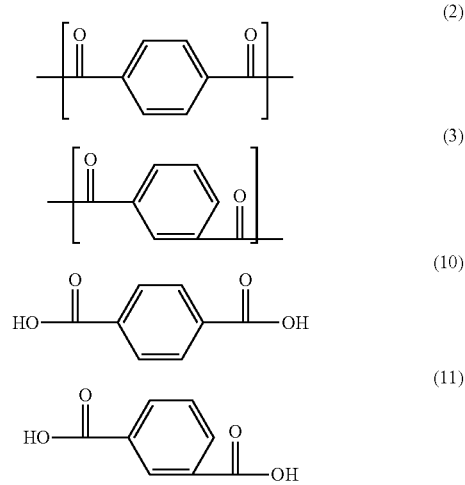

(2)

(3)

(10)

(11)

According to the investigation by the present inventors, the compound represented by chemical formula (10) and/or chemical formula (11) are highly reactive in the manufacture of the wholly aromatic polyester and effectively introduced into the polycondensation polymer of the wholly aromatic polyester, whereby a noncrystalline moiety can be present in the crystalline moiety to provide an effect to enhance the toughness.

In particular, the content of the structural unit represented by chemical formula (2) and/or chemical formula (3) in the wholly aromatic polyester is preferably from 3 to 20 mol % and more preferably from 5 to 20 mol % in view of obtaining the aforementioned effect. It is preferable to use the polyester resin composition in a content within such range since a molded article having excellent mechanical properties can be obtained. In this case, as an example of a preferable combination, the composition ratio in the wholly aromatic polyester is from 30 to 47 mol % of the structural unit represented by chemical formula (1), 50 mol % of the structural unit represented by chemical formula (4), and from 3 to 20 mol % of total of one or two of the structural unit represented by chemical formula (2) and (3).

Since the structural unit represented by chemical formula (2) is excellent in maintaining the heat resistance and the structural unit represented by chemical formula (3) is excellent in maintaining the toughness, the content is determined depending on the purpose.

(Aromatic Diol)

The structural unit derived from "aromatic diol having a carbonyl group (ketone group) in the molecule" in the wholly aromatic polyester is chemical formula (4), which can be obtained by using for example, 4,4'-dihydroxybenzophenone (chemical formula (12)).

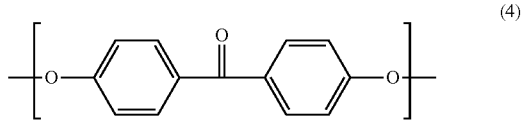

(4)

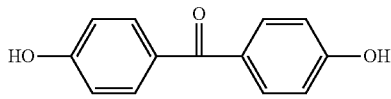
(12)

In the present invention, a moiety of the structural unit represented by chemical formula (4) may be substituted by a structural unit represented by any of chemical formula (5), chemical formula (6), or chemical formula (7). These structural units can be obtained by using, for example, hydroquinone (chemical formula (13)) and derivatives thereof, resorcinol (chemical formula (14)) and derivatives thereof, 4,4'-dihydroxybiphenyl (chemical formula (15)) and derivatives thereof, respectively.

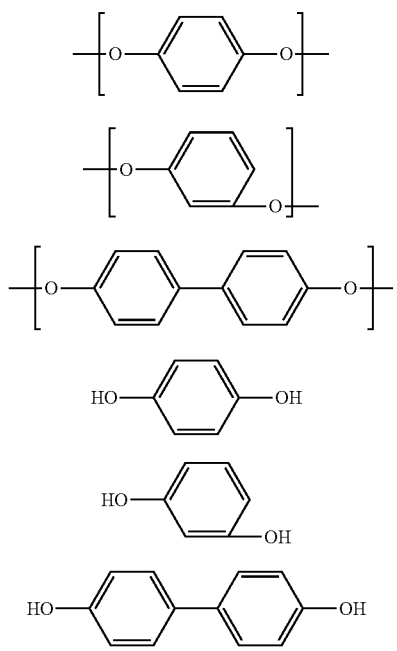

According to the investigation by the present inventors, the compounds represented by chemical formula (13), chemical formula (14), and chemical formula (15) are highly reactive in the manufacture of the wholly aromatic polyester, accelerate the polycondensation reaction of the wholly aromatic polyester and are effectively introduced into the polymer, whereby a noncrystalline moiety can be present in the crystalline moiety to provide an effect to enhance the toughness.

In particular, the resin composition of the structural units represented by chemical formula (5), chemical formula (6), hemical formula (7) in the wholly aromatic polyester is preferably from 3 to 20 mol % and more preferably from 5 to 20 mol %, in view of obtaining the aforementioned effect. It is preferable to use the polyester resin composition in a content within such range since a molded article having excellent mechanical properties can be obtained. In this case, as an example of a preferable combination, the composition ratio in the wholly aromatic polyester is 50 mol % of the structural unit represented by chemical formula (1), from 30 to 47 mol % of the structural unit represented by chemical formula (4), and from 3 to 20 mol % of total of one or two of the structural unit represented by chemical formulae (5) and (6), or 50 mol % of the structural unit represented by chemical formula (1), from 30 to 45 mol % of the structural unit represented by chemical formula (4), and from 5 to 20 mol % of the structural unit represented by chemical formula (7).

Since the structural units represented by chemical formula (5) and chemical formula (7) are excellent in maintaining the heat resistance and the structural units represented by chemical formula (6) and chemical formula (7) are excellent in maintaining the toughness, the content is determined depending on the purpose.

In the present invention, a moiety of the structural unit represented by chemical formula (4) may be substituted by a structural unit represented by chemical formula (8). These structural units can be obtained by using aromatic diol and derivatives thereof (chemical formula (16)) and derivatives thereof.

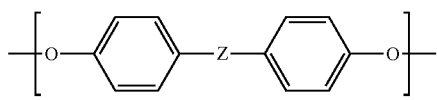
(8)

Z is a divalent substituent group having 1 to 20 atoms comprising at least one of hydrocarbon group, an oxygen atom, and a sulfur atom, wherein the substituent group may have a halogen atom bound thereto. However, Z is not a carbonyl group (—C(=O)—); that is to say, chemical formula (8) does not include chemical formula (4).

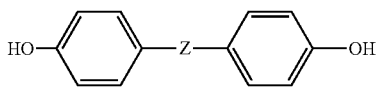
(16)

Z is a divalent substituent group having 1 to 20 atoms comprising at least one of hydrocarbon group, an oxygen atom, and a sulfur atom, wherein the substituent group may have a halogen atom bound thereto. However, Z is not a carbonyl group (—C(=O)—); that is to say, chemical formula (16) does not include chemical formula (12).

Many compounds corresponding to chemical formula (16) are commercially available. The detailed example of "Z" is as follows.

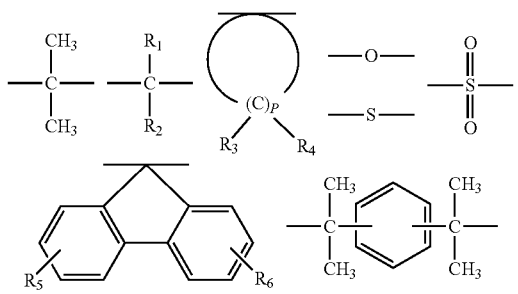

$R_1$ and $R_2$ are hydrogen atoms or hydrocarbon groups having 1 to 10 carbons, $R_3$ and $R_4$ are hydrogen atoms or alkyl groups having 1 to 3 carbons, p is an integer from 4 to 7, and $R_5$ and $R_6$ are any of hydrogen atoms, alkyl groups having 1 to 3 carbons, and halogen atoms.

Especially, a moiety of the structural unit represented by chemical formula (4) may be substituted by a structural unit represented by either of chemical formula (8a) or chemical formula (8b). These structural units can be obtained by using, for example, 4,4'-dihydroxydiphenylsulphone (chemical formula (16a)) and derivatives thereof and 4,4'-dihydroxydiphenylsulfide (chemical formula (16b)), respectively.

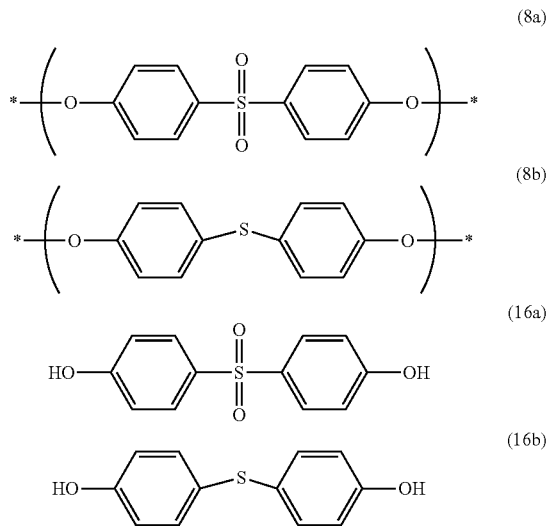

According to the investigation by the present inventors, chemical formula (16) has a flexible connecting region of the 2 aromatic rings, which provides an effect to enhance the toughness as a construction material. In particular, the content of the structural units represented by chemical formula (8) in the entire structural units is preferably from 3 to 20 mol %. When the content is 3 mol % or more, a sufficient toughness can be obtained, and when the content is 20% or less, it is possible to prevent the bulk height from exerting a negative effect on the heat resistance.

In chemical formula (16), "Z" has 6 or less, preferably 3 or less main chain atoms which constitute the connecting group apart from the hydrogen element, in view of the above description.

The individual structural units have been described as above; however, when the entire molecular structure is overviewed, it is considered that the toughness is retained by selecting the ester bond of the structural unit consisted of chemical formula (1) and chemical formula (4) as a repeating unit and by not providing a substituent group in the aromatic ring in the main chain and that both properties of the heat resistance (melting point, glass transition temperature) and injection molding processability of the wholly aromatic polyester derived from the ester bond are exhibited in an efficient and well-balanced manner.

In the manufacture of the crystalline wholly aromatic polyester, preferred is the use of the manufacturing method by solution polymerization in the presence of acetic anhydride in the absence of a solvent or in a specific solvent, and/or two-step polymerization of the solution polymerization and solid phase polymerization, in order to achieve the high melting point and the high crystalline properties of the crystalline wholly aromatic polyester and to sufficiently obtain the mechanical properties required as a constituent material.

A preferred solvent is a polar solvent having a high boiling point which is stable at high temperatures and capable of dissolving the formed polymers, examples being preferably, diphenyl sulphone, sulfolane, dimethyl sulfoxide, diphenyl ether, benzophenone, N-methyl-2-pyrrolidone, and N,N"-dimethyl acetamide, and especially, diphenyl sulphone is more preferable.

It is also preferable to carry out solution polymerization under acetic acid reflux in the presence of from 1.05 to 1.15 molar equivalent of acetic acid anhydride based on the total hydroxyl group of aromatic diol. By adjusting the molar equivalent of acetic acid to be added within the above-described range, the progress of reaction can be accelerated.

The polymer obtained by solution polymerization is cooled and solidified, comminuted to powder-form or flake form, subsequently washed repeatedly with acetone and the like, removed of the used solvent, and then dried with a drying machine.

In addition, when a solid phase polymerization is performed, in a known solid phase polymerization method, for example under an atmosphere of inactive gas such as nitrogen or in vacuum, the prepolymer is heated to a given temperature (at least equal to or lower than the melting point by 5° C.) to the extent that it does not fusion bond to promote deacetic acid polycondensation. The solid phase polymerization may be carried out under stirring or in a still standing state without stirring.

In the polymerization reaction, a catalyst may or may not be used. The catalyst used can be those conventionally known as catalysts for polycondensation of polyesters, including metallic catalysts such as magnesium acetate, tin (I) acetate, tetrabutyltitanate, lead acetate, sodium acetate, potassium acetate, and antimony trioxide, and organic compound catalysts such as N-methyl imidazole.

The polymerization reactor in the solution polymerization is not particularly limited, and preferably, a reactor used for reaction of a general highly viscous fluid is used.

Examples of these reactors include stirred tank reactors having stirring units with stirring blades of anchor type, multi-stage type, spiral band type, spiral axis type, or various shapes formed by changing the shapes thereof, or mixing device generally used in kneading resins such as a kneader, a roller mill, and a Banbury mill.

[Filler]

The filler preferably comprises a filling material, and may be used as a composition material obtained by mixing a filling material and an organic polymer material. The above-described filling material preferably comprises a fibrous filling material and/or nonfibrous filling material. An organic polymer material other than the above-described crystalline wholly aromatic polyester may be comprised. By blending a filler into the resin composition comprising the above-described crystalline wholly aromatic polyester, a molded article can be obtained having heat resistance as well as having excellent mechanical properties and slide properties.

The above-described fibrous filling material may be selected from the inorganic fibrous materials and organic fibrous materials. The inorganic fibrous materials include carbon fibers, silicon carbide fibers, ceramic fibers, glass fibers, asbestos fibers, alumina fibers, zirconia fibers, boron nitride fibers, silicon nitride fibers, boron fibers, wollastonite, whiskers, potassium titanate fibers, and metallic fibers, and preferred are carbon fibers, silicon carbide fibers, ceramic fibers, glass fibers, wollastonite, whiskers, and metallic fibers, and more preferred are carbon fibers and glass fibers. The organic fiber-form materials include organic fibers with high melting points such as aramid fibers. The fibrous filling material may be in a nanofiber form.

The above-described nonfibrous filling materials include mica, silica, talc, alumina, kaolin, calcium sulphate, calcium carbonate, titanium oxide, ferrite, clay, glass powders, zinc oxide, nickel carbonate, ferric oxide, quartz powder, magnesium carbonate, a fluorine resin, graphite, melamine cyanurate, carbon powders, carbon black, nano tubes, molybdenum disulfide, organic molybdenum, barium sulphate, and metallic powders, and preferred are a fluorine resin, graphite and molybdenum disulfide. The nonfibrous filling material may be introduced in a form of powder-like particles or flake-like particles.

The above-described crystalline wholly aromatic polyester is not included in the organic polymer material, and in view of the heat resistance of the polyester resin composition, preference is made to a non-melting polymer material or a polymer material having a high melting point. The polymer materials include for example, polyamide, polyacetal, thermoplastic polyester other than the above-described aromatic polyester, polyethylene, polypropylene, polyisobutylene, polyisoprene, polybutene, poly-p-xylene, polyvinyl chloride, polyvinylidene chloride, polycarbonate, modified polyphenylene ether, polyurethane, polydimethyl siloxane, polyvinyl acetate, polystyrene, methyl polyacrylate, methyl polymethacrylate, an ABS resin, polyphenylene sulfide, polyether ether ketone, polyether ketone, polyphenylene sulfide ketone, polyphenylene sulfide sulphone, polyether nitrile, liquid-crystalline polyester, liquid-crystalline polyester amide, polyarylate, polysulphone, polyether sulphone, polyether imide, polyamide imide, polyimide, polyamino bismaleimide, a triazine resin, an epoxy resin, a phenol resin, a diallylphtalate resin, or modifications thereof, and preferred are polyphenylene sulfide, polyether ether ketone, liquid-crystalline polyester, polyarylate, polysulphone, polyether sulphone, polyether imide, polyamide imide, and polyimide.

The crystalline wholly aromatic polyester and the filler, the organic polymer material, are preferably mixed at a high temperature, suitably at a temperature equal to or above the melting point of the crystalline wholly aromatic polyester. The above-described high temperature is suitably lower than the decomposition temperature of the crystalline wholly aromatic polyester, and suitably equal to or above the main peak of the melt endotherm of the crystalline wholly aromatic polyester. The above-described high temperature is preferably at least 300° C., more suitably at least 350° C.

The content of the filler in the polyester resin composition is preferably from 1 to 200 parts by weight, more preferably from 1 to 150 parts by weight, further preferably from 1 to 100 parts by weight, further more preferably from 5 to 50 parts by weight, especially preferably from 10 to 30 parts by weight, based on 100 parts by weight of the crystalline aromatic polyester. When two or more fillers are included, the total content thereof may be in the above-described ranges. Use of such polyester resin composition of which the content is within the ranges is preferable since a molded article having excellent mechanical properties can be obtained.

<Other Component>

To the polyester resin composition may be added conventionally known colorant, dispersant, plasticizer, antioxidant, flame retardant and the like, apart from the above-described filler.

<Molded Article>

The polyester resin composition according to the present invention may be molded by a conventionally known method and used as a molded article of a resin molding material and the like. For example, the method of molding may be any method of injection molding, compression molding, extrusion molding, injection compression molding, and the like.

The polyester resin composition may also be formed into a sheet or a film by a conventionally known method. For example, the method for forming into a sheet or a film may be any of inflation molding, melt extrusion molding, solution cast molding, and the like. The film may be of a single layer film or multilayer film with different materials. The film or sheet subjected to melt extrusion molding or solution cast molding may be treated with stretching treatment with a single or twin screw for the purpose of improving dimension stability or the mechanical properties.

The polyester resin composition may also be powder coated onto the surface of the coated object by a known method. Among these, flow immersion method, thermal spraying method, electrostatic powder coating, and the like are preferred. For example, by electrostatic powder coating, it is uniformly attached with powder of the polyester resin composition, melted at about from 350° C. to 400° C., and then removed from the electric oven to be quenched. In order to stabilize the crystalline state and remove the residual stress, annealing treatment may be performed.

The polyester resin composition can also be impregnated with carbon fiber aggregates as a matrix resin by a known method to obtain CFRP. Examples include resin transfer molding (RTM), vacuum assisted resin transfer molding (VaRTM), or reaction injection molding (RIM), and the like. Further, injection molding or press molding can be performed after impregnating the matrix resin, or the matrix resin can be impregnated by press molding.

<Purpose>

The molded article consisted of the polyester resin composition according to the present invention has excellent mechanical properties of the bending strength and the bending elastic modulus. Accordingly, the molded article according to the present invention is useful as a constituent material of various mechanical parts, automobile parts, and electric and electronic parts, in particular, various bearings, various gears, various valves, chassis, shaft bearings, washers, thrust washers, seal rings, guide rings, vane pump parts, ESC parts, impeller piston rings, shift forks, FOUP, coating of electrical cables, vibrating plates of speakers, insulating films, various medical appliances, banding bands, clamps, tubes, soundproof heat insulation films, construction materials and the like of aircrafts.

EXAMPLES

The present invention is further described in details hereunder; however, the present invention is not limited by the Examples hereunder.

The method for manufacturing the crystalline wholly aromatic polyester to be blended into the polyester resin composition according to the present invention is shown below.

Synthesis Example 1 Manufacture of Crystalline Wholly Aromatic Polyester

Compound (9): Compound (12): Compound (15)=50:40:10

To a 6LSUS tank with a stirrer, 503.55 g (1.95 mol) of 4,4'-dicarboxy diphenyl ether, 334.18 g (1.56 mol) of 4,4'- dihydroxy benzophenone, 72.62 g (0.39 mol) of 4,4'-dihydroxy biphenyl, 2520.46 g of predried diphenylsulphone as a solvent, 0.16 g of potassium acetate and 0.16 g of magnesium acetate as a catalyst are fed in, and after nitrogen substitution by performing pressure reduction-nitrogen injection of the tank three times, 437.93 g (4.29 mol) of acetic acid anhydride is further added, the rotational speed of the stirring blade was set to 100 rpm, and acetylation reaction was performed for 2 hours at reflux state at 150° C.

After completion of the acetylation, the tank in a state of which acetic acid is distilled out was heated up to 180° C. and depressurized to 100 Torr. Thereafter, in a state of which 100 Torr is maintained, the temperature was raised to 280° C. by 0.5° C./min. Thereafter, the temperature was maintained at 280° C. and kept for 60 minutes and then the polymer was taken out from the flask to be cooled and solidified. The obtained polymer was comminuted into a size which passes through a sieve having a mesh size of 2.0 mm by a grinding machine to obtain a crude polymer. To the obtained crude polymer was added 7 L of acetone and stirred for 15 minutes, then filtered to remove the solvent. The operation was repeated for the total of 4 times and the contained solvent was removed. Subsequently, a prepolymer was obtained by drying for 4 hours at 120° C.

Then, the prepolymer obtained above was filled into a rotary oven and after increasing the heating temperature from room temperature at 20° C./hour while rotating, the temperature was kept at 340° C. for 2 hours and solid phase polycondensation was performed to obtain the wholly aromatic polyester. By using the obtained wholly aromatic polyester, the following polyester resin composition was made.

Example 1

100 parts by weight of wholly aromatic polyester was blended with 11 parts by weight of carbon fiber-form filler (manufactured by Toho Tenax K.K., product name: HTC702) and by using a φ25 mm twin screw extruder (L/D=41), extrusion was performed at a cylinder temperature of 350° C., screw rotating speed of 100 rpm, and resin introduction amount of 6 kg/h to obtain polyester resin composition A.

By using an injection molding machine (manufactured by Sumitomo Heavy Industries, Ltd. SE18DUZ), pellets of the obtained polyester resin composition A were molded into a test specimen by using metal molds of a stick-form molded article of 80×10×4 mm (thickness) and a plate-form molded article of 40×40×2 mm (thickness) at a cylinder temperature of 360° C. and a metal mold temperature of 180 C.

Example 2

Extrusion was performed in a similar manner as Example 1 except that to 100 parts by weight of wholly aromatic polyester were blended 12.5 parts by weight of carbon fiber-form filler (manufactured by Toho Tenax K.K., product name: HTC702) and 12.5 parts by weight of PTFE (manufactured by Kitamura Limited KT-400M), whereby polyester resin composition B was obtained.

By using an injection molding machine (manufactured by Sumitomo Heavy Industries, Ltd. SE18DUZ), pellets of the obtained polyester resin composition B were molded into a test specimen by using metal molds of a stick-form molded article of 80×10×4 mm (thickness) and a plate-form molded article of 40×40×2 mm (thickness) at a cylinder temperature of 360° C. and a metal mold temperature of 180° C.

Comparative Example 1

Extrusion was performed in a similar manner as Example 1 except that only the wholly aromatic polyester was used to obtain the wholly aromatic polyester (no filler).

By using an injection molding machine (manufactured by Sumitomo Heavy Industries, Ltd. SE18DUZ), the obtained wholly aromatic polyester (no filler) was molded into a test specimen by using metal molds of a stick-form molded article of 80×10×4 mm (thickness) and a plate-form molded article of 40×40×2 mm (thickness) at a cylinder temperature of 360° C. and a metal mold temperature of 180° C.

(Measurement of Melting Point)

By using the obtained pellets as above, the melting points were measured with a differential scanning calorimeter (DSC) manufactured by Hitachi High-Tech Science Corporation. The endothermic peak was determined as the melting point, which was obtainable when the temperature was increased from room temperature to 390° C. at a rate of temperature increase of 20° C./min to melt the polymer completely, and subsequently decreasing the temperature to 50° C. at a rate of 10° C./min, and further increasing to 420° C. at a rate of 20° C./min. The measured results are summarized in Table 1.

(Measurement of Bending Strength)

The bending strength was measured in accordance with ISO 178 by using the stick-form test specimens of 80 mm (length)×10 mm (width)×4 mm (thickness) which were obtained from the above-described injection molding.

(Measurement of Bending Elastic Modulus)

The bending elastic modulus was measured in accordance with ISO 178 by using the stick-form test specimens of 80 mm (length)×10 mm (width)×4 mm (thickness) which were obtained from the above-described injection molding.

(Measurement of Dynamic Friction Coefficient)

The dynamic friction coefficient was measured in accordance with JISK7218 by using the plate-form test specimens of 30 mm (length)×30 mm (width)×2 mm (thickness) which were obtained from the above-described injection molding.

The measured results of the melting points, bending strength, and bending elastic modulus of Example 1 and Comparative Example 1 are shown in the following Table 1. As shown in Table 1, the molded article consisted of a polyester resin composition in which a carbon fiber-form filler was blended to the wholly aromatic polyester had excellent mechanical properties of the bending strength and the bending elastic modulus as compared with the molded article consisted only of the wholly aromatic polyester to which no carbon fiber-form filler was blended, while having similar melting points.

TABLE 1

| | blended amount | | measured result | | |
|---|---|---|---|---|---|
| | polyester (parts by weight) | carbon fibers (parts by weight) | melting point (° C.) | bending strength (MPa) | bending elastic modulus (GPa) |
| Example 1 | 100 | 11 | 349 | 207 | 9.3 |
| Comparative Example 1 | 100 | 0 | 352 | 160 | 4.3 |

The measured results of the melting points, bending strength, and bending elastic modulus of Example 2 and Comparative Example 1 are shown in the following Table 2. As shown in Table 1, the molded article consisted of the polyester resin composition in which a carbon fiber-form filler and PTFE were blended to the wholly aromatic polyester had lower friction coefficient and excellent mechanical properties of the bending strength and the bending elastic modulus as compared with the molded article consisted only of the wholly aromatic polyester to which neither carbon fiber-form filler nor PTFE were blended, while having similar melting points.

TABLE 2

| | blended amount | | | measured result | | | |
|---|---|---|---|---|---|---|---|
| | polyester (parts by weight) | carbon fibers (parts by weight) | PTFE (parts by weight) | melting point (° C.) | bending strength (MPa) | bending elastic modulus (GPa) | friction coefficient |
| Example 2 | 100 | 12.5 | 12.5 | 348 | 168 | 9.6 | 0.25 |
| Comparative Example 1 | 100 | 0 | 0 | 352 | 160 | 4.3 | 0.45 |

The invention claimed is:

1. A polyester resin composition comprising a crystalline wholly aromatic polyester which is a polycondensate of an aromatic dicarboxylic acid and an aromatic diol, and a filler, wherein a structural unit derived from the aromatic dicarboxylic acid comprises a structural unit represented by chemical formula (1):

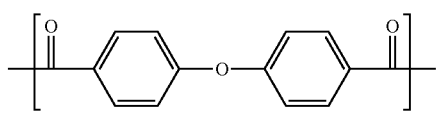

(1)

and a structural unit derived from the aromatic diol comprises chemical formula (4):

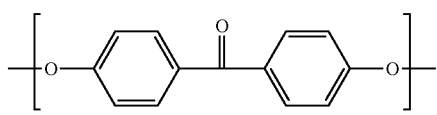

(4)

and the content of the structural unit represented by chemical formula (1) and the structural unit represented by chemical formula (4) in the entire structural units of the crystalline wholly aromatic polyester is 80 mol % to 100 mol %.

2. The polyester resin composition according to claim 1, wherein
the filler comprises a fibrous filling material.

3. The polyester resin composition according to claim 2, wherein
the fibrous filling material is selected from the group consisting of a carbon fiber, a silicon carbide fiber, a ceramic fiber, a glass fiber, a wollastonite, a whisker, and a metallic fiber.

4. The polyester resin composition according to claim 1, wherein
the filler comprises a nonfibrous filling material.

5. The polyester resin composition according to claim 4, wherein
the nonfibrous filling material is selected from the group consisting of a fluorine resin, graphite, and molybdenum disulfide.

6. The polyester resin composition according to claim 1, wherein
the content of the filler in the polyester resin composition is from 1 to 200 parts by weight based on 100 parts by weight of the crystalline aromatic polyester.

7. A polyester resin composition comprising a crystalline wholly aromatic polyester which is a polycondensate of an aromatic dicarboxylic acid and an aromatic diol, and a filler, wherein a structural unit derived from the aromatic dicarboxylic acid comprises a structural unit represented by chemical formula (1):

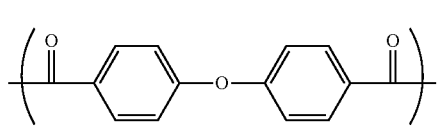

(1)

and a structural unit derived from the aromatic diol comprises chemical formula (4):

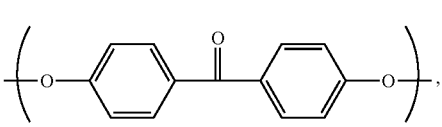

(4)

and the structural unit derived from the aromatic diol further comprises at least one of the structural units represented by chemical formula (5), chemical formula (6), chemical formula (7), and chemical formula (8):

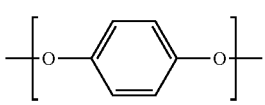

(5)

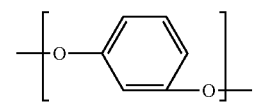

(6)

-continued

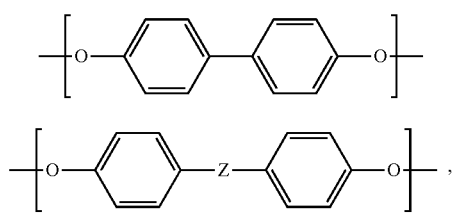

wherein

Z is a divalent substituent group having 1 to 20 atoms comprising at least one of a hydrocarbon group, an oxygen atom, and a sulfur atom, wherein the substituent group may have a halogen atom bound thereto, provided that Z is not a carbonyl group —C(=O)—, and the content of the structural unit represented by chemical formula (1) and the structural unit represented by chemical formula (4) is 80 mol % to 97 mol % and the total content of the structural unit represented by chemical formulae (5), (6), (7) and (8) is from 3 to 20 mol % in the entire structural units of the crystalline wholly aromatic polyester.

8. A molded article consisting of the polyester resin composition according to claim 1.

9. The polyester resin composition according to claim 2, wherein
the content of the filler in the polyester resin composition is from 1 to 200 parts by weight based on 100 parts by weight of the crystalline aromatic polyester.

10. The polyester resin composition according to claim 3, wherein
the content of the filler in the polyester resin composition is from 1 to 200 parts by weight based on 100 parts by weight of the crystalline aromatic polyester.

11. The polyester resin composition according to claim 4, wherein
the content of the filler in the polyester resin composition is from 1 to 200 parts by weight based on 100 parts by weight of the crystalline aromatic polyester.

12. The polyester resin composition according to claim 5, wherein
the content of the filler in the polyester resin composition is from 1 to 200 parts by weight based on 100 parts by weight of the crystalline aromatic polyester.

13. A molded article consisting of the polyester resin composition according to claim 2.

14. A molded article consisting of the polyester resin composition according to claim 4.

15. A molded article consisting of the polyester resin composition according to claim 6.

16. A molded article consisting of the polyester resin composition according to claim 7.

* * * * *